3,280,118
N-(7-2'-THIENYLACETAMIDOCEPH - 3 - EM-3-
YLMETHYL)-PYRIDINIUM - 4 - CARBOXY-
LATE SALTS AND PROCESS
Stephen Eardley, Ruislip, Middlesex, Gabrielle Stocker, Berkhampsted, and Alan Gibson Long, Greenford, Middlesex, England, assignors to Glaxo Laboratories Limited
No Drawing. Filed Nov. 4, 1964, Ser. No. 408,757
Claims priority, application Great Britain, Nov. 4, 1963, 43,441/63
11 Claims. (Cl. 260—243)

This invention is concerned with improvements in or relating to compounds having antibacterial activity.

The antibiotic cephalosporin C has recently come into prominence. A number of analogues of cephalosporin C have now been developed, wherein the substitution at the 7-amino group and/or the 3-position side-chain is varied, and several of such analogues have shown conspicuous advantages over the parent antibiotic.

It has previously been found that the acetoxy group of the 3-position acetoxymethyl group can advantageously be replaced by a quaternary amino group, for example an N-pyridyl group, and some compounds of this type have shown particularly marked activity. The presence of the quaternary ammonium group together with the carboxylate anion at the 4-position results in a betaine or zwitterion structure for the molecule. Such compounds have hitherto been prepared by reacting a tertiary amine with a 7-acyl-aminocephalosporanic acid whereby the betaine is formed directly without the quaternary ammonium group being associated with any anion other than that of the 4-position carboxylate anion.

We have now found that such betaines react with acids, particularly acids having a pKa at room temperature of 4.0 or less, to form quaternary ammonium salts wherein the 4-position carboxylate anion is protonated and the positive charge on the quaternary nitrogen atom is satisfied by the anion of the strong acid. Such salts may be made in crystalline, stable forms that are in general less likely than the parent betaines to suffer decomposition on storage; a salt showing such advantages is the hydrochloride of the thienyl-acetamido-pyridinium compound.

According to the present invention, therefore, there are provided salts containing cations of the general formula:

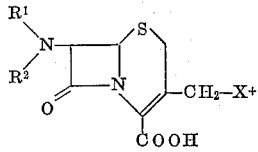
(I)

wherein $R^1$ is a hydrogen atom and $R^2$ is an acyl group or $R^1$ and $R^2$ are both acyl groups, and X is a quaternary amino group, particularly one derived from a mononuclear heterocycle, the anion of the salt preferably being derived from an acid having a pKa of 4 or less (as measured in water). Acids having a pKa of 4 or less are referred to herein as strong acids.

The invention also includes within its scope a process which comprises reacting an aqueous solution or suspension of a betaine of the general formula:

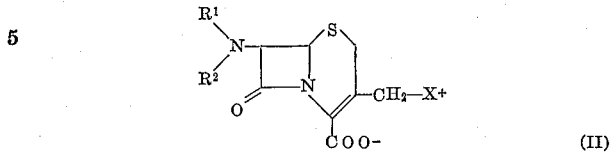
(II)

wherein $R^1$, $R^2$ and X have the meanings defined above with an acid, particularly an acid having a pKa of 4 or less, to form a salt having a cation as defined above. It is to be noted that said solution or suspension need not be pure since the process may be used with advantage to purify crude solutions or suspensions of the betaine containing, for example, base X. The betaine may thus be recovered from said crude solution or suspension in the form of a salt as defined above, from which salt the betaine may be regenerated by reaction with a base, for example in the form of an ion-exchange resin.

Purification of the betaine in this way obviates difficulties in handling compounds that are amphoteric and soluble in water and require otherwise to be purified and isolated by tedious methods, such as ion-exchange chromatography and by evaporation of aqueous solutions at low temperatures. The purified betaine may then be converted into another salt as desired.

Whilst $R^2$ (and $R^1$ where appropriate) may represent an acyl group in general terms, specific acyl groups which may be used include those having the general formulae:

(i) $R'(CH_2)_nCO$—where $R'$ is aryl, cycloalkyl, substituted aryl, substituted cycloalkyl or heterocyclic group and $n$ is an integer from 1–8, preferably 1–4. The heterocyclic ring is preferably a 5- or 6-membered ring containing one or more of O, S and N or such a ring fused to benzene. Examples of these groups include phenylacetyl, nitrophenylacetyl, phenylpropionyl, cyclohexylacetyl and thienylacetyl.

(ii) $C_nH_{2n+1}CO$—where $n$ is 0 or an integer from 1–7. The alkyl group may be straight or branched and, if desired, may be interrupted by an oxygen or a sulphur atom. Examples of such groups include formyl, acetyl, hexanoyl, heptanoyl, octanoyl and butylthioacetyl.

(iii) $C_nH_{2n-1}CO$—where $n$ is an integer from 2–7. The alkenyl group may be straight or branched and, if desired, may be interrupted by an oxygen or a sulphur atom. Examples of such groups include acrylyl and allylthioacetyl.

(iv) $R'OCR''R'''\cdot CO$—where $R'$ has the meaning defined under (i) or is an alkyl group and $R''$ and $R'''$ are the same or are different and each is a hydrogen atom or an alkyl group. An example of such a group is phenoxyacetyl.

(v) $R'SCR''R'''\cdot CO$—where $R'$, $R''$ and $R'''$ are as defined under (iv). Examples of such thio groups includes S-phenylthioacetyl, S-chlorophenylthioacetyl and S-bromophenylthioacetyl.

(vi) $R'(CH_2)_mS(CH_2)_nCR''R'''\cdot CO$—where $R'$, $R''$ and $R'''$ are as defined under (iv), $m$ is an integer from 1–4 and $n$ is 0 or an integer from 1–4. Examples of such a group include S-benzylthioacetyl, benzylthiopropionyl and β-phenethylthioacetyl.

(vii) R'CO—where R' has the meaning defined under (i). Examples of such groups include benzoyl, substituted benzoyl and cyclopentanoyl. Where the benzoyl group is substituted the substituents may be alkyl or alkoxy and the substituents may be in the 2- or 2- and 6-position.

The group X preferably represents an N-pyridyl group or an N-pridyl group substituted, e.g. with one or more alkyl, carboxy, carbamoyl etc. groups such as an N-picolinyl group, N-isonicotinyl group or N-nicotinamido group.

It is to be noted that in the preparation of the salt according to the invention the groups $R^1$ and $R^2$ will not in general enter into the reaction and from this point of view are relatively unimportant. If $R^1$ and/or $R^2$ contain a basic group this may also form a salt group and it will be appreciated that the amount of acid used may have to be adjusted accordingly. The group X although entering into the reaction is also relatively unimportant from this point of view.

The salts according to the invention may be prepared from an aqueous solution or suspension of the parent betaine by reaction with the desired acid. Formation of salts can be demonstrated by electrophoresis: until they are protonated the betaines behave as uncharged molecules, so that they migrate little in neutral buffers; in acid buffers, for instance an aqueous mixture of acetic and formic acids at pH 2, the betaines are protonated and move, as positively charged ions, to the cathode. The stability of such salts depends on their dissociation (that is, reversal of the salt-forming reaction) by dilution with water or by evaporation, and on their solubility. Thus, strong organic acids such as trichloroacetic acid, preferably, mineral acids such as sulphuric, perchloric, nitric, hydrochloric, hydrobromic, and hydriodic, give salts that do not suffer dissociation by evaporation of their aqueous solutions, and some yield insoluble salts; salts with formic acid, which is weaker than those just named, may be soluble and dissociate on evaporation of their aqueous solutions, so that the betaine is recovered and the acid is evaporated with the water.

We have found it convenient with strong acids to add these at a concentration of 0.8 N or greater to a solution of the betaine but it should be understood that the concentration of the acid as such is relatively unimportant so long as the desired salt is formed. With strong acids this will normally occur at a pH of 2 or less in the reaction mixture as stated above.

A number of the salts are water soluble and these may be isolated by, for example, evaporation and crystallisation or freeze drying etc. Thus, for example, the compound in which X forms an N-pyridyl group, $R^1$ is hydrogen and $R^2$ is a thienylacetyl group forms a hydrobromide which has been crystallised on evaporation while its hydrogen phosphate has been isolated by freeze-drying. The hydrochloride may also be isolated by evaporation and crystallisation and is a particularly useful form of the antibiotic for formulation, in possessing greater stability on storage than the parent betaine while retaining excellent water solubility and physiological compatibility (provided it is suitably buffered on administration).

Other salts are water-insoluble and precipitate from the aqueous medium when the pH is reduced below 2. In the case of the above pyridyl-thienylacetyl compound, the perchlorate, tetrafluoroborate, iodide and nitrate all precipitate readily and such substantially insoluble salts afford a useful means of isolating and of purifying the antibiotic. The precipitation may be facilitated by the common ion technique.

It is possible to exchange the anions associated with the salt by, for example, treatment with an anion-exchanger.

The betaine form of the antibiotic can if desired be readily regenerated by slurrying the salt in an aqueous medium with an anion exchanger in a weak acid form e.g. the acetate form. The resulting acetate salt is unstable and loses the acetate ion on processing e.g. freeze drying to yield the betaine. The betaine may be recovered from the aqueous medium by freeze drying or by direct crystallisation. Alternatively the betaine may be regenerated by contacting an aqueous medium containing the salt with a water-immiscible phase containing a liquid ion exchanger e.g. Amberlite L.A. 1 or Amberlite L.A. 2, the betaine being regenerated in the aqueous phase and the residual ions of the salt combining with the ion exchanger. The betaine may also be regenerated by reacting the salt in an aqueous medium with an organic base e.g. a tri (loweralkyl) amine and recovering the betaine e.g. by freeze drying or direct crystallisation.

When N-(7-2'-thienylacetamidoceph-3-em-3-ylmethyl)-pyridinium-4-carboxylate is regenerated in an aqueous medium from a salt and is then recovered by direct crystallisation the resulting crystalline form is a non-hygroscopic hydrate. However on subsequent drying the material loses its water of crystalline and becomes hygroscopic although it is relatively stable to heat.

The salts according to the invention, in that they contain an un-ionized —COOH group, may be useful in the preparation of esters for example by reaction with diazoalkanes. Esters of the salts according to the invention are new compounds never previously described in the literature.

The salts according to the invention may advantageously be formulated in pharmaceutical compositions, provided their anions do not increase substantially the toxicity of the salt.

According to a further feature of the invention, therefore we provide pharmaceutical compositions comprising a salt according to the invention, the associated anions of which are physiologically compatible, together with one or more pharmaceutical carriers or excipients. The salts should preferably be formulated in a dry form e.g. in oral or rectal forms such as tablets, dragees, capsules, powders, cachets, suppositories etc., or in forms for injection e.g. in ampoules containing the dry salt ready for dissolution. Such ampoules conveniently contain a buffer salt or salts, e.g. sodium citrate or acetate, to raise the pH to above 4, preferably to about 7, on dissolution in sterile water with regeneration of the betaine; otherwise the injection vehicle supplied to dissolve the salt should contain such a buffer or other neutralising substance, to regenerate the betaine.

Buffers which may be used include, for example, alkali metal formates, acetates, succinates, citrates, phosphates and glycinates, particularly the sodium salts.

In order that the invention may be well understood we give the following examples by way of illustration only:

*Example 1.—N-(7-2'-thienylacetamidoceph-3-em-3-ylmethyl)-pyridinium-4-carboxylate hydrochloride*

To a solution of N-(7-2'-thienylacetamidoceph-3-em-3-ylmethyl)pyridinium-4-carboxylate (25 g.; $5.78 \times 10^{-2}$ mole) in water (50 ml.) was added N-hydrochloric acid (57.8 ml.; $5.78 \times 10^{-2}$ mole). The pale yellow solution was freeze-dried and the resulting material was triturated with methanol whereupon it dissolved but quickly separated as a fine white solid described in Table I. For ease of presentation the remaining examples are given in tubular form but the general method used was essentially that described above for Example 1. The nuclear magnetic resonance spectrum of the product of Example 3 shows that it contains methanol. In Examples 2 and 4–8 crystallisation or precipitation occurred and the precipitates were triturated with water.

In Example 9, the freeze-dried solid was collected and dried.

TABLE 1.—SALTS DERIVED FROM N-(7-2'-THIENYLACETAMIDOCEPH-3-EM-3-YLMETHYL)PRYIDINIUM-4-CARBOXYLATE

| Ex. No. | Anion | Yield, percent | Ultraviolet $\lambda$ max., E1% 1 cm. | Ultraviolet $\lambda$ max., E1% 1 cm. | R* | $\beta$-lactam, cm.$^{-1}$ | Amide, cm.$^{-1}$ | $CO_2H$, cm.$^{-1}$ | $[\alpha]_D^\dagger$ |
|---|---|---|---|---|---|---|---|---|---|
| 1 | Cl$^-$ | 89 | 255 m$\mu$ 311 | 239 m$\mu$ 331 | 1.07 | 1,776 | 1,690 and 1,538 | 1,710 | $-14°$ |
| 2 | CCl$_3$CO$_2^-$ | 88 | 255 m$\mu$ 254 | 240 m$\mu$ 279 | 1.09 | 1,788 | 1,668 and 1,552 | 1,720 | $-11°$ |
| 3 | HSO$_4^-$ | 73 | 255 m$\mu$ 260 | 240 m$\mu$ 282 | 1.08 | 1,778 | 1,692 and 1,530 HSO$_4^-$ 1,180 and 1,160 | 1,720 | $-28°$ |
| 4 | Br$^-$ | 74 | 255 m$\mu$ 278 | 240 m$\mu$ 303 | 1.09 | 1,770 | 1,690 and 1,520 | 1,720 | a$+27°$ |
| 5 | NO$_3^-$ | 85 | 255 m$\mu$ 289 | 240 m$\mu$ 318 | 1.07 | 1,780 NO$_3^-$ | 1,690 and 1,525 1,330 | 1,710 | d$-16°$ |
| 6 | ClO$_4^-$ | 83 | 255m$\mu$ 281 | 240 m$\mu$ 307 | 1.09 | 1,770 ClO$_4^-$ | 1,698 and 1,548 1,100 | 1,720 | $-24°$ |
| 7 | BF$_4^-$ | 63 | 250 m$\mu$ 274 | 240 m$\mu$ 295 | 1.08 | 1,762 | 1,693 and 1,540 | 1,720 | $-5°$ |
| 8 | I$^-$ | 70 | 255 m$\mu$ 267 | 228 m$\mu$ 475 | c1.78 | 1,775 | 1,696 and 1,515 | 1,633 | b13° |
| 9 | H$_2$PO$_4^-$ | 93 | 255 m$\mu$ 273 | 240 m$\mu$ 300 | 1.10 | 1,775 | 1,662 and 1,540 | (?) 1,705 | $+16°$ |

ANALYSIS

| Ex. No. | Found, percent | | | | | Required, percent | | | |
|---|---|---|---|---|---|---|---|---|---|
| | C | H | N | S | | C | H | N | S |
| 1 | 46.8 | 4.8 Cl, 7.35 | 8.8 | 13.9 13.6 | C$_{19}$H$_{18}$ClN$_3$O$_4$S$_2$2H$_2$O | 46.8 | 4.5 Cl, 7.3 | 8.8 | 13.1 |
| 2 | 42.7 | 3.6 Cl, 18.2 | 6.9 | 11.4 | C$_{21}$H$_{18}$Cl$_3$N$_3$O$_6$S$_2\frac{1}{2}$H$_2$O | 42.9 | 3.3 Cl, 18.1 | 7.15 | 11.0 |
| 3 | 43.8 | 3.65 | 7.7 | 18.3 | C$_{19}$H$_{19}$N$_3$O$_8$S$_3\frac{1}{2}$H$_2$O | 43.7 | 3.9 | 8.0 | 18.4 |
| 4 | 44.68 | 4.38 Br, 15.8 | 8.2 | 12.9 | C$_{19}$H$_{18}$BrN$_3$O$_4$S$_2\frac{1}{2}$H$_2$O | 45.1 | 3.9 Br, 15.8 | 8.3 | 12.7 |
| 5 | 47.4 | 3.96 | 11.6 | 12.9 | C$_{19}$H$_{18}$N$_4$O$_7$S$_2\frac{1}{2}$H$_2$O | 47.5 | 3.9 | 11.6 | 13.3 |
| 6 | 41.7 | 4.0 Cl, 6.9 | 7.8 | 11.9 | C$_{19}$H$_{18}$ClN$_3$O$_8$S$_2$2H$_2$O | 41.4 | 4.0 Cl, 6.4 | 7.6 | 11.6 |
| 7 | 43.6 | 4.0 | 7.7 | 12.5 | C$_{19}$H$_{18}$BF$_4$N$_3$O$_4$S$_2$1H$_2$O | 43.9 | 3.9 | 8.0 | 12.3 |
| 8 | 41.8 | 4.1 I, 22.2 | 7.6 | 11.8 | C$_{19}$H$_{18}$IO$_4$N$_3$S$_2\frac{1}{2}$H$_2$O | 41.7 | 3.4 I, 23.2 | 7.7 | 11.7 |
| 9 | 43.3 | 3.7 P, 5 | 7.8 | 12.2 | C$_{19}$H$_{20}$N$_3$O$_8$PS$_2\frac{3}{4}$H$_2$O | 43.2 | 4.1 P, 5.9 | 8.0 | 12.1 |

*R = Ration of E1% 1 cm. values at 240 m$\mu$ and 255 m$\mu$.
† Determined on 1.0–1.5% solutions in H$_2$O:Me$_2$CO 1:1.
a Determined on 1% solution in H$_2$O.
b Determined on 0.7% solution in H$_2$O:Me$_2$CO 2:1.
c Hypsochromic effect of iodide ion chromophore.
d $+39°$ in aqueous phosphate buffer at pH 6.

In like manner the following acids were used: oxalic, citric, lactic, tartaric, picric, p-toluenesulphonic, iodic, nitrous, chloroplatinic, phosphomolybdic, and silicontungstic acids.

*Example 10.—N-(4-methoxycarbonyl-7-2'-thienylacetamidoceph-3-em-3-ylmethyl)-pyridinium chloride*

To a solution of the tetrafluoroborate (see Example 7) (4.65 g.) in acetone (25 ml.) was added an excess of diazomethane in acetone-ether (1:1). A small amount of insoluble material was removed by filtration and the excess of diazomethane was destroyed by dropwise addition of glacial acetic acid. The ether was removed by rotary evaporation at $\leqslant 40°$ and the acetone solution reduced to low bulk. Water was then added to the oily mixture and, in an attempt to achieve a clear solution, addition of more acetone was necessary. The resulting orange solution was then evaporated at $\leqslant 40°$ when an orange oil separated and was removed. Evaporation and removal of smaller amounts of orange oil was continued until a solid separated (1.38 g.; 27%), M.P. 164–171°, $\nu$ max. 1780 ($\beta$-lactam), 1715 and 1235 (—COOMe), 1640 and 1528 (—CONH—), and 1060 cm.$^{-1}$ (BF$_4^-$), $\lambda$ max. 256 m$\mu$ (E$_{1\text{ cm.}}^{1\%}$ 256)

$\lambda$ max. 240 m$\mu$ (E$_{1\text{ cm.}}^{1\%}$ 264)

A portion of this ester salt (796 mg.) was dissolved in 50%-aqueous acetone (8 ml.) and put through a De- Acidite FF ion-exchange column in the chloride form, which was eluted with 50%-aqueous acetone. The acetone was removed from the fraction by rotary evaporation at ≤40° and the aqueous solution was freeze-dried to give a foam (633 mg.). The foam (611 mg. in water) was treated again with the ion-exchange column to give N-(4-methoxycarbonyl - 7 - 2' - thienylacetamidoceph - 3 - em-3-ylmethyl)-pyridinium chloride (550 mg.), M.P. 134–141°, $[\alpha]_D^{20}+19°$ (c., 1.0; water), ν max. 1788 (β-lactam); 1730 (—CO₂Me); and 1678 and 1540

(—CONH—)

cm.$^{-1}$, λ max. 242–243 mμ

($E_{1cm}^{1\%}$ 273)

λ max. 255–256 mμ

($E_{1cm}^{1\%}$ 268)

(Found: C, 46.5; H, 4.8; Cl, 7.6; N, 7.9; S, 12.6, $C_{20}H_{19}ClN_3O_4S_2 \cdot 3H_2O$ requires C, 46.2; H, 5.0; Cl, 6.8; N, 8.1; S. 12.3%).

*Example 11.—Regeneration of N-(7-2'-thienylacetamidoceph-3-em-3-ylmethyl)-pyridinium-4-carboxylate*

To a suspension of the chloride (see Example 1) (3 g.) in water (20 ml.), was added 1.5 N-ammonium hydroxide dropwise until the salt dissolved (pH 4.5). The resulting solution was passed down a Dowex-1 ion-exchange column (2.5 cm. x 20 cm.) in the acetate-form, which was eluted with water. The eluant was freeze-dried and the pale yellow product was triturated with methanol to give N-(7 - 2' - thienylacetamidoceph - 3 - em - 3 - ylmethyl-pyridinium-4-carboxylate as a fine white powder (2.55 g.; 91%), λ max. 240 mμ

($E_{1cm}^{1\%}$ 367)

λ max. 255 mμ, ($E_{1cm}^{1\%}$ 335)

ν max. 1758 (β-lactam), 1628 (COO⁻), and 1675 and 1540 cm.$^{-1}$ (—CONH—), $[\alpha]_D^{20}+47°$ (c., 0.098; water).

The betaine was produced likewise, in 100% yield, from the nitrate (see Example 5).

*Example 12*

N - (7 - 2' - thienylacetamido - 3 - em - 3 - ylmethyl)-pyridinium-4-carboxylate hydronitrate (100 g.) was suspended in distilled water (650 ml.) and shaken with a solution of Amberlite liquid anion exchanger No. 2 (LA 2, 100 ml.) in petrol (B.P. 40–60°, 500 ml.) until all the solid had dissolved. The aqueous layer was separated and washed with LA 2 (20 ml.) in petrol (200 ml.), LA 2 (20 ml.) in petrol (400 ml.) and twice with petrol (250 ml. each). The organic layers were backwashed successively with water (150 ml.). The aqueous layer and backwash were stirred under reduced pressure to remove solvent, filtered and cooled to 0° for 16 hrs. The N-(7-2'-thienylacetamidoceph - 3 - em - 3 - ylmethyl)-pyridinium-4-carboxylate was collected by filtration, washed with ice-cold water (60 ml.), followed by acetone (300 ml.) and dried in vacuo at room temperature for 64 hrs. Yield 50.0 g., 57.8% theory, $[\alpha]_D+48.4°$ (c., 1 in water), pH 5.0 (c., 1 in water)

$\lambda_{max.}^{H_2O}$ 240 mμ, $E_{1cm}^{1\%}$ 394, λ infl. 255 mμ, $E_{1cm}^{1\%}$ 361

$$\text{Ratio} \frac{E \text{ at } 240}{E \text{ at } 255}=1.09$$

*Example 13.—Intramuscular injection*

As this is to be injected intramuscularly, a sterile presentation is necessary.

To the compound of Example 1 in sterile form, sterile sodium glycinate is added in the approximate ratio of 250 parts of the hydrochloride to 70 parts of sodium glycinate.

The dry material should be in the form of fine powder approximately 60 to 100 mesh sieve (British standard).

Blending should take place in a drum or suitable blender, and continue until the product is homogeneous. The resultant powder should be filled into vials containing approximately 320 mgm. of blend for a 250 mgm. dose vial, or 640 mgm. blend for a 500 mgm. dose vial, keeping the relative humidity in the filling room as low as possible, preferably below 10 percent relative humidity.

During processing and filling the product should be protected from exposure to light and moisture. The filled vials should be well sealed.

*Preparation of sterile sodium glycinate*

To produce sterile sodium glycinate, a 20 percent w./v. solution is made in water for injection. The solution is sterilised and clarified by filtration through a No. 5/3 sintered glass filter. The filtered solution is transferred in a shallow tray to a deep-freeze unit, and frozen to a temperature of at least —40° C. When this temperature has been attained, the frozen solution is transferred to a freeze-drying unit. Freeze-drying should commence and continue, until a moisture content of ≯1 percent is reached. The freeze-drying cycle should be approximately 18 to 24 hours.

The freeze-dried cake is then powdered, by grinding in a mortar and sieved.

In the above process all equipment is sterilised and aseptic technique employed while processing.

We claim:
1. A salt of the cation:

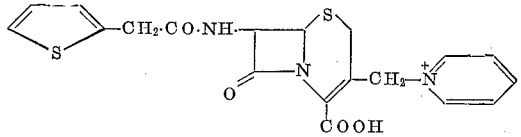

with an anion of an acid having a pKa of not greater than 4.

2. N - (7 - 2' - thienylacetamidoceph - 3 - em - 3-ylmethyl)-pyridinium-4-carboxylate hydronitrate.

3. N - (7 - 2' - thienylacetamidoceph - 3 - em - 3-ylmethyl)-pyridinium-4-carboxylate hydrobromide.

4. N - (7 - 2' - thienylacetamidoceph - 3 - em - 3-ylmethyl)-pyridinium-4-carboxylate hydrogen phosphate.

5. N - (7 - 2' - thienylacetamidoceph - 3 - em - 3-ylmethyl)-pyridinium-4-carboxylate hydrochloride.

6. N - (7 - 2' - thienylacetamidoceph - 3 - em - 3-ylmethyl)-pyridinium-4-carboxylate hydrogen perchlorate.

7. N - (7 - 2' - thienylacetamidoceph - 3 - em - 3-ylmethyl)-pyridinium-4-carboxylate hydrogen sulphate.

8. N - (7 - 2' - thienylacetamidoceph - 3 - em - 3-ylmethyl)-pyridinium-4-carboxylate hydrogen tetrafluoroborate.

9. N - (7 - 2' - thienylacetamidoceph - 3 - em - 3-ylmethyl)-pryridinium-4-carboxylate hydriodide.

10. N - (7 - 2' - thienylacetamidoceph - 3 - em - 3-ylmethyl)-pyridinium-4-carboxylate hydrogen trichloroacetate.

11. A process for the purification of a crude aqueous solution of a betaine of the formula:

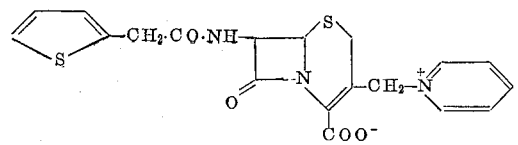

which comprises contacting said solution with an acid having a pKa of not greater than 4 to form an acid addition salt of said betaine with said acid; recovering the resultant salt; regenerating said betaine from said salt by contacting said salt in an aqueous medium with a reagent selected from the group consisting of anion exchange resins in the base form; anion exchange resins in the weak acid form and tri(lower-alkyl) amines and recovering the betaine from the aqueous medium.

References Cited by the Examiner
UNITED STATES PATENTS

| | | | |
|---|---|---|---|
| 3,218,318 | 11/1965 | Flynn | 260—243 |
| 3,225,038 | 12/1965 | Flynn | 260—243 |
| 3,226,384 | 12/1965 | Abraham et al. | 260—243 |

ALEX MAZEL, *Primary Examiner.*

JAMES W. ADAMS, JR., *Assistant Examiner.*